Dec. 23, 1969  J. J. P. OLIVIER  3,485,606
METHOD AND APPARATUS FOR THE REGULATION OF GAS HEATING SYSTEMS
Filed March 1, 1965

Inventor
Jean Joseph Pierre Olivier
by Curtis, Morris and Safford
his Attorneys

United States Patent Office 3,485,606
Patented Dec. 23, 1969

3,485,606
METHOD AND APPARATUS FOR THE REGULATION OF GAS HEATING SYSTEMS
Jean Joseph Pierre Olivier, Le Havre, France, assignor to Compagnie Francaise de Raffinage, Paris, France
Filed Mar. 1, 1965, Ser. No. 436,172
Claims priority, application France, Mar. 2, 1964, 965,796
Int. Cl. F17d *1/04*
U.S. Cl. 48—190                                     8 Claims

ABSTRACT OF THE DISCLOSURE

A method for controlling heat flux of a fuel gas supplied to a furnace, the heat flux of which fuel gas may vary abruptly. This method comprises: (a) measuring directly a pressure in a main fuel gas supply line at a point upstream of a gas flow regulator means for said furnace; (b) maintaining constant, at a point upstream of said gas flow regulator means for said furnace, the product of the Wobbe index multiplied by the square root of the pressure of the main fuel gas supply line by means of a furnace-simulating means, said furnace simulating means comprising:

(1) A Wobbe meter burning fuel gas from the main fuel gas supply line and measuring the heat flux thereof;

(2) An adjustable, calibrated orifice means on the fuel supply line to the Wobbe meter;

(3) A differential pressure-reducing means, interposed between said main fuel supply line and said Wobbe meter, for reducing the pressure between said Wobbe meter and said gas-supply line for said Wobbe meter, said differential pressure-reducing means maintaining a constant pressure drop in said calibrated orifice means; and said maintaining constant of said Wobbe index and the square root of the pressure in the fuel supply line being achieved by transmitting a reading from said Wobbe meter to a pressure regulator of said fuel gas upstream of said gas-flow regulator for said furnace, and by adjusting the pressure regulator on the main supply responsive to a change in said Wobbe meter. A furnace control device has also been provided.

---

The present invention relates to the control and regulation of the gas heating of industrial furnaces. It is more particularly concerned with a method of measurement and adjustment of the calorific flux of a gaseous mixture, the properties of which, in particular the calorific power and the density, may vary rapidly within wide limtis. The invention also concerns a device with low inertia which simulates a furnace to a reduced scale together with its means of supply, and permits the said method to be carried into effect.

In the conduit systems of fuel gas of petroleum refineries, large variations in the composition of the gas occurs frequently, for example when starting-up or stopping the introduction and the vaporization of liquefied residuary gases. These variations are very rapid and make regulation difficult by conventional methods, of the gas heating of industrial furnaces.

Following the conventional methods of regulation of the combustion of gas in furnaces, there is utilized a regulator of the transfer temperature (temperature of the hot product leaving the furnaces). This regulator emits a signal which is a function of the difference between the real transfer temperature and the datum point (previously fixed transfer temperature) which signal is received by a flow regulator acting on a valve so as to regulate the rate of flow of gas to the burners. Now, the regulation of this flow-rate takes place with a certain delay by reason of the nature of the furnace, of the thermal capacity of the apparatus and of the time of treatment of the product.

Thus, a variation in the composition of the gas is only detected by the regulator of the transfer temperature after a certain delay which may reach five minutes, so that the corrections made by the regulator take place too late and sometimes even in the wrong direction if between times the disturbance has ceased, a momentary enrichment of the gas causing for example a peak in the transfer temperature which is compensated by the regulator by a reduction of the flow-rate of a fuel which has returned to its initial composition.

The flow-rate of a gas is determined from a difference of pressure $\Delta h$ in a calibrated restriction orifice provided on the supply piping, the volumetric flow Q at a given instant, corrected for normal conditions of temperature and pressure, being expressed by the equation:

$$Q = K \times \sqrt{\Delta h} \times \sqrt{\frac{P}{MT}}$$

in which:

K is a constant depending on the units, on the diameter of the piping, on the restriction, on the Reynolds number and on the compressibility of the gas (considered as negligible as compared with the accuracy of measurement);
P is the absolute pressure of the gas;
T is the absolute temperature of the gas;
M is the molecular weight of the gas.

Representing by H the lower calorific power of the gas, the heat flow F is expressed by the equation:

$$F = QH = K \times \sqrt{\Delta h} \times \frac{H}{\sqrt{M}} \times \sqrt{\frac{P}{T}}$$

There is generally introduced into this equation the Wobbe index $$W = \frac{H}{\sqrt{d}}$$

in which $d$ is the density of the gas with respect to air. In practice, the gas is substantially at ambient temperature and it will be assumed in the remainder of the present description that the temperature T is constant. As the density $d$ is proportional to the molecular weight M, the heat flux can thus be written:

$$F = k \times \sqrt{\Delta h} \times W \sqrt{P}, \text{ in which}$$

$$k = \frac{0.186 K}{\sqrt{T}}$$

For a given datum value $\Delta h$ of the transfer temperature regulator, the heat flux thus varies as $W\sqrt{P}$.

One of the methods of regulation already utilized to compensate for the changes of composition of the gas consists of maintaining the supply pressure P constant and adjusting the product $W\sqrt{\Delta h}$. It is therefore necessary to measure W separately by calorimetry, for example with a wobbemeter, and $\Delta h$, and then to calculate the product $W\sqrt{\Delta h}$. This product constitutes the signal transmitted to the gas flow regulator, which controls the supply valve for the burners as a function of the indications coming from the temperature regulator. The main drawback of this method resides in its high cost due to the use of calculators and to the necessity of providing as many regulating units as there are furnaces to be operated.

There has also been employed a method consisting of regulating the characteristics of the fuel gas by the addition of a rich gas to that in the main, in order to control and regulate the Wobbe index. This system enables a number of furnaces to be operated simultaneously but it necessitates the use of a source of rich gas and the use of a ratio adjuster to dose the additional quantity of rich gas as a function of the instantaneous demand of fuel gas.

Another means of regulating the heat flux consists in allowing the pressure to vary while maintaining constant the product $W\sqrt{P}$ instead of W alone. In order to regulate the flow of calories (i.e., heat flux) to the burners, it follows from the equation $F=k\sqrt{\Delta h}\times W\sqrt{P}$ that it is only necessary to regulate $\Delta h$ as a function of the heat demand. The regulation of $W\sqrt{P}$ to achieve a constant value (i.e., heat flux) can me effected by acting only on the pressure, which is much simpler than separately regulating W and P, and permits of the simultaneous operation of several furnaces.

However, the measurement of the product $W\sqrt{P}$ is very complicated and again necessitates the use of calculating machines; the absolute pressure must be measured and then its square root must be extracted in an analogue calculator on the one hand, and to measure W in a wobbemeter on the other, and finally to obtain the product $W\sqrt{P}$ in a multiplying machine.

The applicant has invented a much more simple method of direct measurement, without calculation, of the product $W\sqrt{P}$, this method resulting from the following considerations:

When a wobbemeter is supplied with a fuel gas, the calorific power (i.e., heat of combustion) and the pressure of which vary, and when the drop of pressure, i.e., depression $\Delta p$ over a calibrated orifice (on the supply pipe of the wobbemeter) is maintained constant, this wobbemeter measures a heat flow $$F'=\text{constant}\times\sqrt{\Delta p}\times W\sqrt{P}$$

which is in proportion to the product $W\sqrt{P}$ and which is in consequence exactly proportion to the flow of calories F reaching the burners of the furnace.

An invarying drop of pressure across an orifice, i.e., $\Delta p$ is obtained by the use of a differential pressure reducing device, of the diaphragm type for example.

The adjustment of the drop in pressure, i.e., $\Delta p$ on the pipe supplying the wobbemeter by means of the differential pressure-reducing device is therefore identical with the adjustment of $\Delta h$ on the supply to the furnaces of the unit, and the wobbemeter thus equipped plays the part of a real furnace simulator.

The invention has therefore for its object:

(1) A method of control and regulation of the heat flux of the fuel gas supplying industrial furnaces, consisting of directly measuring without calculation and maintaining constant, upstream of the gas-flow regulator, the product of the Wobbe index times the square root of the pressure of the gas system, by means of a furnace-simulating device.

(2) A furnace-simulating device comprising, in combination:

A wobbemeter supplied by the fuel gas in such manner that the drop in pressure across an orifice $\Delta p$ remains constant;

A calibrated orifice arranged on the supply pipe of the wobbemeter;

A differential pressure-reducing device, of the diaphragm type for example, which maintains the drop in pressure across an orifice $\Delta p$ constant in the calibrated orifice, and reduces the pressure between the supply system and the wobbemeter;

Devices for transmitting the indications of the wobbemeter to the pressure regulator of the supply system.

The invention is illustrated by the accompanying drawings, in which.

Figure 1:
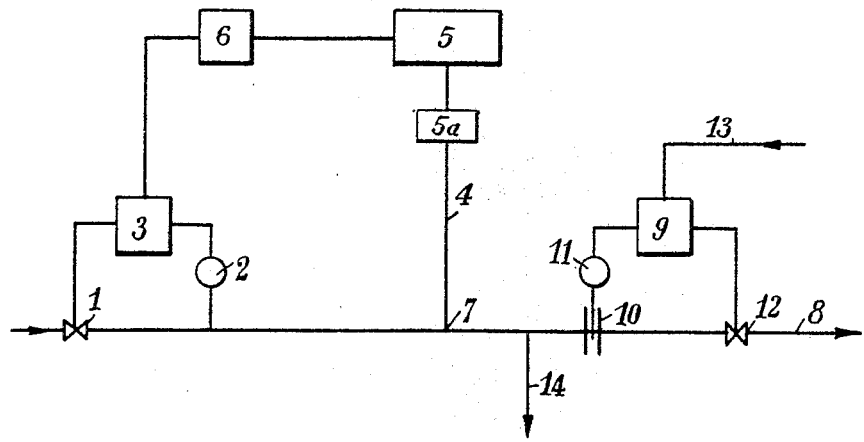
FIG. 1 illustrates diagrammatically the method of automatic regulation of the product $W\sqrt{P}$ and the supply of the burners.

With reference to FIG. 1, the pressure of gas reduced in a valve 1 is applied to a pressure-gauge 2 which measures the effective pressure. This pressure is transmitted to a pressure-regulator 3. A line 4 supplies a wobbemeter 5 through interposed flow-regulator 5a; the wobbemeter 5 thus measures $W\sqrt{P}$ and transmits to the pressure-regulator 3, directly or through an intermediate safety relay 6, a signal which is a function of the difference between the fixed value of the product $W\sqrt{P}$ and the measured value of the product $W\sqrt{P}$. As the wobbemeter is a regulator with integral action, it is not necessary to regulate the absolute pressure but only the relative pressure measured by the pressure-gauge 2. The regulator 3 which receives the signal from the wobbemeter 5 on the one hand and the indication of the pressure of the pressure-gauge 2 on the other, compares these two measurements and controls the regulating valve 1 of the reduced pressure, in such manner that the product $W\sqrt{P}$ remains constant.

The gaseous mixture arriving at 7 is such that the product $W\sqrt{P}$ is constant, and it is with this mixture that the furnaces of a single unit are supplied, mounted downstream of the regulation described below. In order to regulate the heat flux reaching the furnace supplied by line 8, a gas-flow regulator 9 adjusts the pressure drop $\Delta h$ in a restriction 10, i.e., an orifice, the said pressure drop being measured by a differential pressure-gauge 11 and acting on a valve 12 as a function of the readings received from the heat transfer-temperature regulator coming from line 13.

The furnace supplied by the line 14 may have its flow regulated in the same manner as that supplied by the line 8, since it utilizes the same mixture, of which the product $W\sqrt{P}$ is maintained constant.

Figure 2:
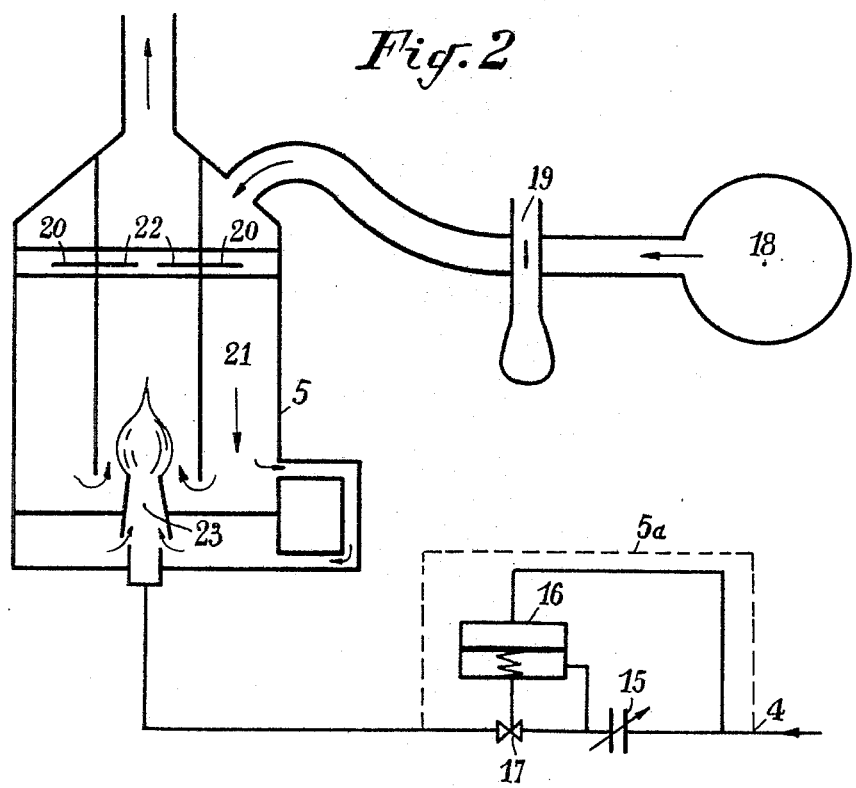
FIG. 2 is a diagrammatic representation of the circuit diagram utilized for measuring $W\sqrt{P}$.

The wobbemeter 5 is supplied through the flow-regulator 5a, as shown in FIG. 2.

The fuel gas comes in by the line 4 at the pressure P. The supply piping is provided with a restriction 15 creating a pressure drop $\Delta p$, which is applied to a differential pressure-reducing device 16, of the diaphragm type for example.

When the pressure drop $\Delta p$ varies, the differential pressure-reducing device 16 regulates the flow of gas by acting on the opening of the valve 17 in such manner that the pressure drop $\Delta p$ in the restriction 15 is brought back to the fixed value. The supply flow to the wobbemeter being proportional to the flow in the restriction 15, the valve 17 reduces the pressure between the supply line 4 and the wobbemeter 5.

The flow of calories reaching the wobbemeter is determined in a conventional manner: the rise in temperature of a current of air of constant flow, supplied by a blower 18, is measured with respect to the ambient temperature in an orifice 19, the temperature rise being itself measured by means of a battery of thermo-couples, of which the cold weld 20 is located in the air-intake 21 and the hot weld 22 in the hot gases produced by the combustion of the gaseous mixture in a burner 23.

Thus, the temperature rise of the air is proportional to the flux of calories (i.e., heat flux) arriving at the burner, since this flux is itself proportional to $W\sqrt{P}$ when the pressure drop $\Delta p$ is maintained constant.

The device for measuring the product $W\sqrt{P}$ can thus be constituted, for example, by the combination of a wobbemeter measuring the calorific flux; of members for transmitting the readings of the wobbemeter to the pressure-regulator of the system; of a calibrated orifice constituted by means of a needle valve enabling the restriction to be varied at the time of calibration of the apparatus; and of a differential pressure-reducing device, to which is applied the pressure drop in the calibrated orifice and which maintains this pressure drop constant by acting on the gas-supply valve for the wobbemeter.

This method of regulation of the supply of the furnaces offers, in addition to its simplicity, the following advantages:

A single apparatus can serve to operate a number of furnaces of the same unit;

The technique utilized is precise, since the wobbemeter measures and regulates $W\sqrt{P}$ effectively to within the accuracy of measurement;

The metering of the mass-flow of the gas is just as easy as with a regulation which maintains P constant. In fact, in the case of the regulation according to the invention, as the knowledge of $\Delta h$ enables the calorific flux F to be calculated directly by the formula: $F = \text{constant} \times \sqrt{\Delta h}$, it is possible to determine precisely the standard fuel (10,000 thermal units per ton) consumed in the unit. If the hydrogen content of the fuel gas is constant, since the calorific power per unit mass of the hydrocarbons is practically constant, the calorific power (i.e., heat of combustion) per kg. is also constant, and in consequence measurement of the heat-flow gives a measure of the mass-flow.

The regulation of the air at the furnace is facilitated by a constant calorific flux, since it is in fact known that 1 cu. m. of air is necessary, under normal conditions, for about 950 calories supplied by hydrocarbons.

The example given below, which has no limitative nature, brings out the advantages of such a method of measurement and regulation.

The furnaces of a catalytic reforming unit treating 500 tons of product per day are supplied with a refinery gas, the Wobbe index of which varies between 11,000 and 15,000 kcal./Nm.$^3$ (62.7×10$^6$ joules per Nm.$^3$), and the maximum pressure of which is 2.5 relative bars (one bar=1,000,000 dynes/cm.$^2$).

The product $W\sqrt{P}$ is fixed in such manner that $W$=11,000 kcal./Nm.$^3$, when $P$=2.5 relative bars, that is to say, for a rich gas in which $W$=15,000 kcal./Nm.$^3$, the pressure must be 1.34 relative bars.

The supply pressure of the wobbemeter is maintained on the average about 0.030 relative bars by means of a device consisting of a differential pressure-reducing device of the diaphragm type, which adjusts the loss of pressure in a calibrated orifice to a constant value through the intermediary of the gas supply valve of the wobbemeter.

It is found that the product $W\sqrt{P}$ is maintained constant with an accuracy of the order of 1%, together with the transfer temperature with an accuracy of ±1° C.

Operations on the fuel gas system which involve abrupt injections of liquefied gases do not cause any disturbance to the heating, which is not possible with a conventional system of regulation.

It results from this example that this method of control provides trouble-free heating with gas of very large units comprising several furnaces, by virtue of the device according to the invention.

What I claim is:

1. A method for controlling heat flux of a fuel gas supplied to a furnace, the heat flux of which fuel gas may vary abruptly, which comprises:
    (a) measuring directly a pressure in a main fuel gas supply line at a point upstream of a gas flow regulator means for said furnace;
    (b) maintaining constant, at a point upstream of said gas flow regulator means for said furnace, the product of the Wobbe index multipled by the square root of the pressure of the main fuel gas supply line, thereby admitting gas of desired heat flux to said furnaces, said maintaining constant being achieved by means of a furnace-simulating means, said furnace simulating means comprising:
    (1) a Wobbe meter burning fuel gas and measuring the heat flux thereof, the fuel gas coming from the same supply as that to the furnace;
    (2) an adjustable, calibrated orifice means located on the Wobbe meter fuel supply line;
    (3) a differential pressure-reducing means, interposed between said main fuel supply line and said Wobbe meter, for reducing the pressure between said Wobbe meter and said gas-supply line for said Wobbe meter, said differential pressure reducing means maintaining a constant pressure drop in said calibrated orifice means; said maintaining constant of the product of said Wobbe index and the square root of the pressure in the fuel supply line being achieved by transmitting a reading from said Wobbe meter to a pressure regulator of said fuel gas upstream of said gas-flow regulator for said furnace, and by adjusting the pressure regulator of the main supply responsive to a change in said Wobbe meter.

2. A method for controlling heat flux of a fuel gas supplied to a furnace, the heat flux of which fuel gas may vary abruptly, which comprises:
    (a) measuring directly a pressure in a main fuel gas supply line at a point upstream of a gas-flow regulator means for said furnace;
    (b) supplying a Wobbe meter, connected in shunt with said main fuel gas supply line, with gas from said main fuel line downstream from a fuel line regulator means for said main fuel gas supply line;
    (c) regulating the gas flow to said Wobbe meter with an intermediary flow regulating means on the gas line supplying the Wobbe meter;
    (d) obtaining a reading from said Wobbe meter which is a function of a difference between a fixed and the measured product of the Wobbe index multiplied by the square root of the pressure in the main fuel gas supply line;
    (e) adjusting a valve means responsive to the reading defined in step (d) to regulate a supply of fuel in said main fuel supply line;
    (f) regulating a gas supply to said furnace by a furnace gas-flow regulator means in shunt on the supply line to said furnace, which furnace gas-flow regulator means regulates the pressure drop in a restriction means on the supply line to said furnace, said pressure drop in said gas supply line for said furnace being measured by a differential pressure gauge means, by acting on a valve means in said gas supply line to said furnace.

3. The method according to claim 2, wherein the adjusting of a valve means in step (e) is responsive to the reading defined by the Wobbe meter and which valve means are connected to a pressure gauge means measuring the effective pressure of said main fuel supply line.

4. An apparatus for controlling the heat flux of a fuel gas supplied to a furnace, the heat flux of which fuel gas may vary abruptly comprising in combination:
    (a) a pressure regulator means on a main fuel supply line;
    (b) a Wobbe meter on a line in shunt with the main fuel supply line;
    (c) on the line supplying gas to said Wobbe meter
        ($\alpha$) an adjustable, calibrated orifice means operatively interconnected to;
        ($\beta$) a differential pressure reducing means on a line in shunt with the main fuel supply line and reading a pressure drop across said calibrated orifice means responsive to changes in pressure drop across said orifice and capable of maintaining the pressure drop across said orifice constant;
    (d) means for transmitting the reading of said Wobbe meter to said pressure regulator means on said main fuel supply line;

(e) a gas-flow regulator means mounted in shunt on a gas supply line to the furnace for regulating said furnace.

5. An apparatus according to claim 4, wherein the calibrated orifice is adjustable by a needle-valve means and wherein the differential pressure reducing means working in conjunction with said orifice is a diaphragm means.

6. An apparatus according to claim 4, wherein a plurality of furnaces are supplied from the main supply line.

7. An apparatus according to claim 6, and wherein on each of the supply lines to each of the plurality of furnaces is a gas flow regulator means operatively interconnected and responsive to a heat transfer-temperature regulator means, a differential pressure gauge means, an orifice means showing a pressure drop in said supply line operatively interconnected to said differential pressure gauge means, a valve, and means for adjusting said valve.

8. A furnace simulation device suitable for controlling the heat flux of fuel gas supplied to a furnace and comprising in combination:

(a) a Wobbe meter means supplied from a main fuel supply line;

(b) on the line supplying the Wobbe meter from the main supply line ($\alpha$) an adjustable, calibrated orifice means operatively interconnected to;

($\beta$) a differential pressure reducing means which maintains a constant pressure drop in said calibrated orifice; and (c) means for transmitting the reading obtained from said Wobbe meter to a valve means on said main fuel supply line for adjusting responsively the valve means to control said heat flux.

References Cited

UNITED STATES PATENTS 2,349,521 5/1944 Schmidt _____ 137—6
3,273,982 9/1966 McDonald et al. _____ 48—180

MORRIS O. WOLK, Primary Examiner

J. OLSEN, Assistant Examiner

U.S. Cl. X.R.

23—255; 48—191; 73—421.5; 137—6, 90; 236—15